United States Patent
Hinque

(10) Patent No.: US 9,758,000 B2
(45) Date of Patent: *Sep. 12, 2017

(54) SELF-INFLATING TIRE WITH PRESSURE REGULATOR

(71) Applicant: The Goodyear Tire & Rubber Company, Akron, OH (US)

(72) Inventor: Daniel Paul Luc Marie Hinque, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 283 days.

This patent is subject to a terminal disclaimer.

(21) Appl. No.: 14/538,914

(22) Filed: Nov. 12, 2014

(65) Prior Publication Data

US 2015/0165841 A1    Jun. 18, 2015

Related U.S. Application Data

(60) Provisional application No. 61/916,932, filed on Dec. 17, 2013.

(51) Int. Cl.
*B60C 23/12* (2006.01)

(52) U.S. Cl.
CPC ....... *B60C 23/12* (2013.01); *Y10T 152/10495* (2015.01)

(58) Field of Classification Search
CPC ........ B60C 23/004; B60C 23/10; B60C 23/12

USPC .......................................... 152/419, 423–426
See application file for complete search history.

(56) References Cited

U.S. PATENT DOCUMENTS

| 9,308,784 B2 * | 4/2016 | Hinque | B60C 23/12 |
| 2015/0165840 A1 * | 6/2015 | Hinque | B60C 23/12 |
| | | | 152/450 |

FOREIGN PATENT DOCUMENTS

| EP | 2565061 A1 | 3/2013 |
| EP | 2746073 A2 | 6/2014 |
| EP | 2881269 A1 | 6/2015 |

OTHER PUBLICATIONS

European Search Report for Application No. 14197274 dated Jun. 26, 2015.

* cited by examiner

*Primary Examiner* — Jason Bellinger
(74) *Attorney, Agent, or Firm* — June E. Rickey

(57) ABSTRACT

A self-inflating tire assembly includes an air tube connected to a tire and defining an air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to a regulator device. The regulator device regulates the inlet air flow to the air tube and the outlet air flow to the tire cavity.

16 Claims, 13 Drawing Sheets

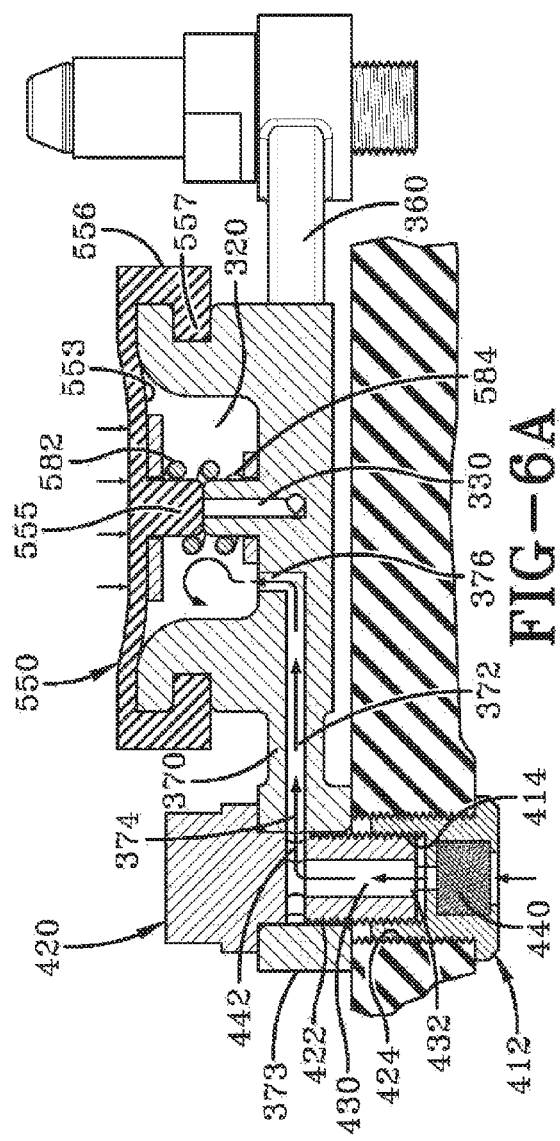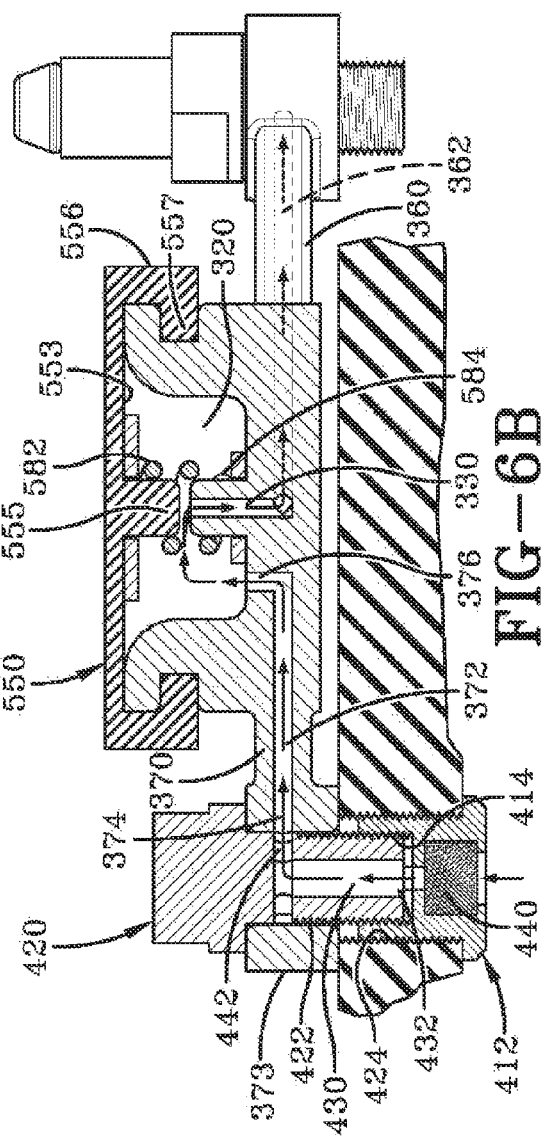

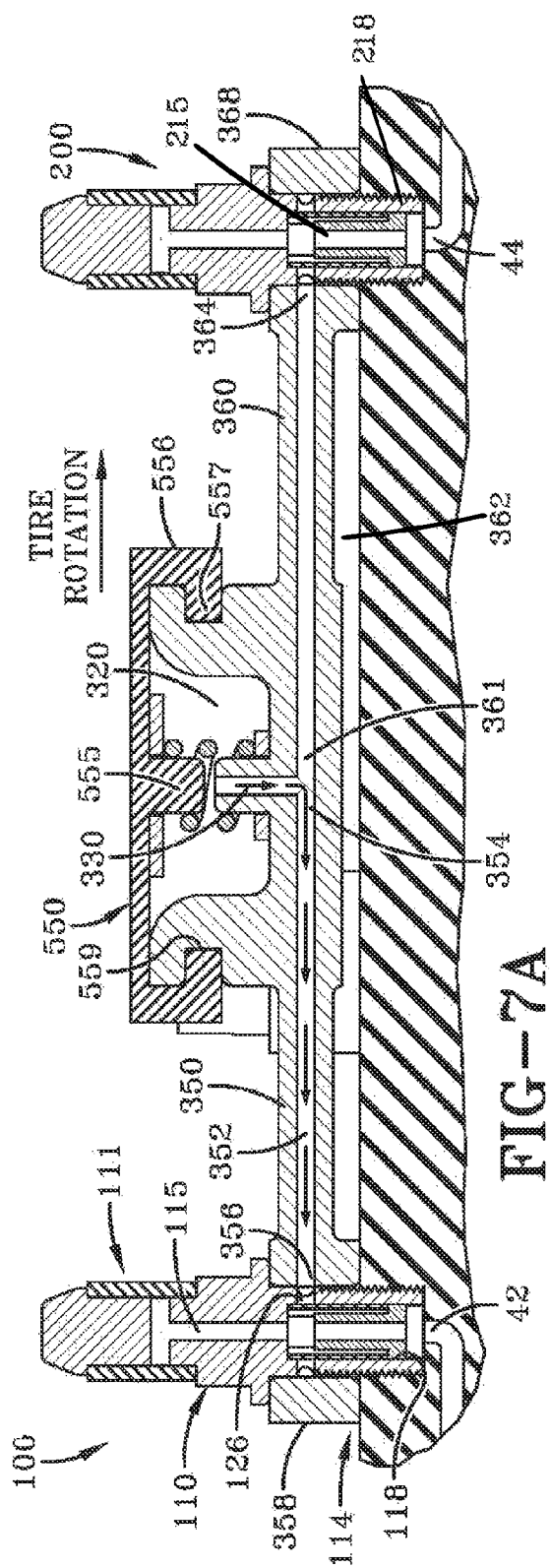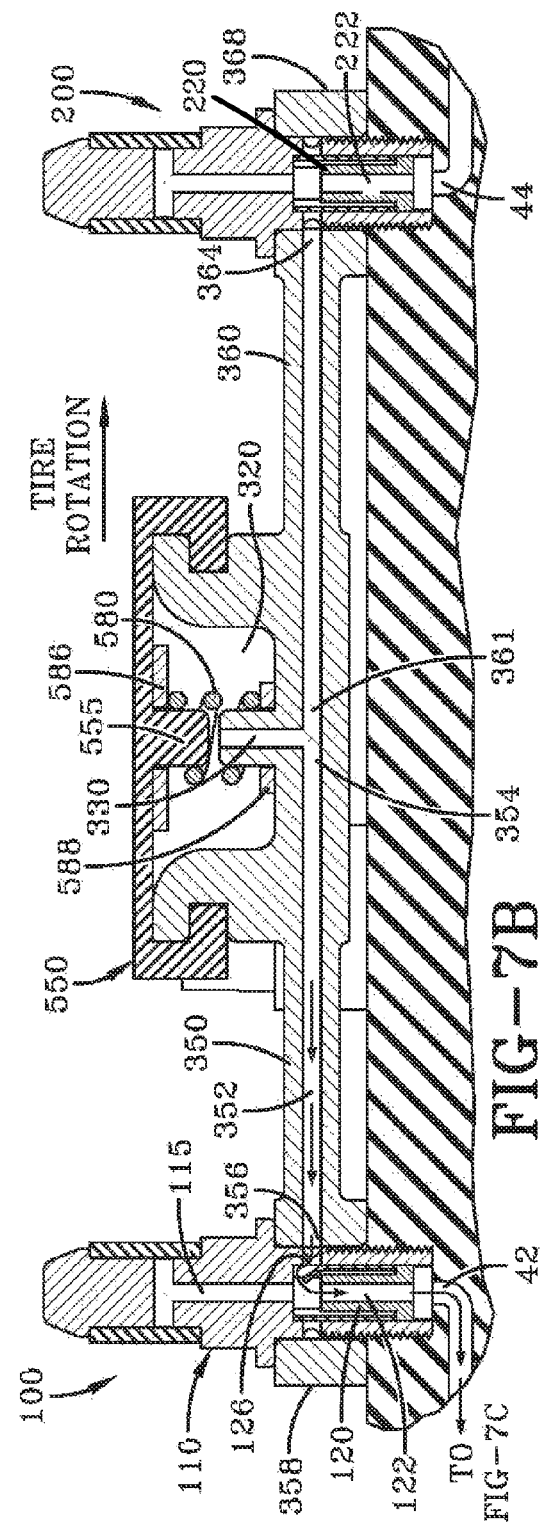

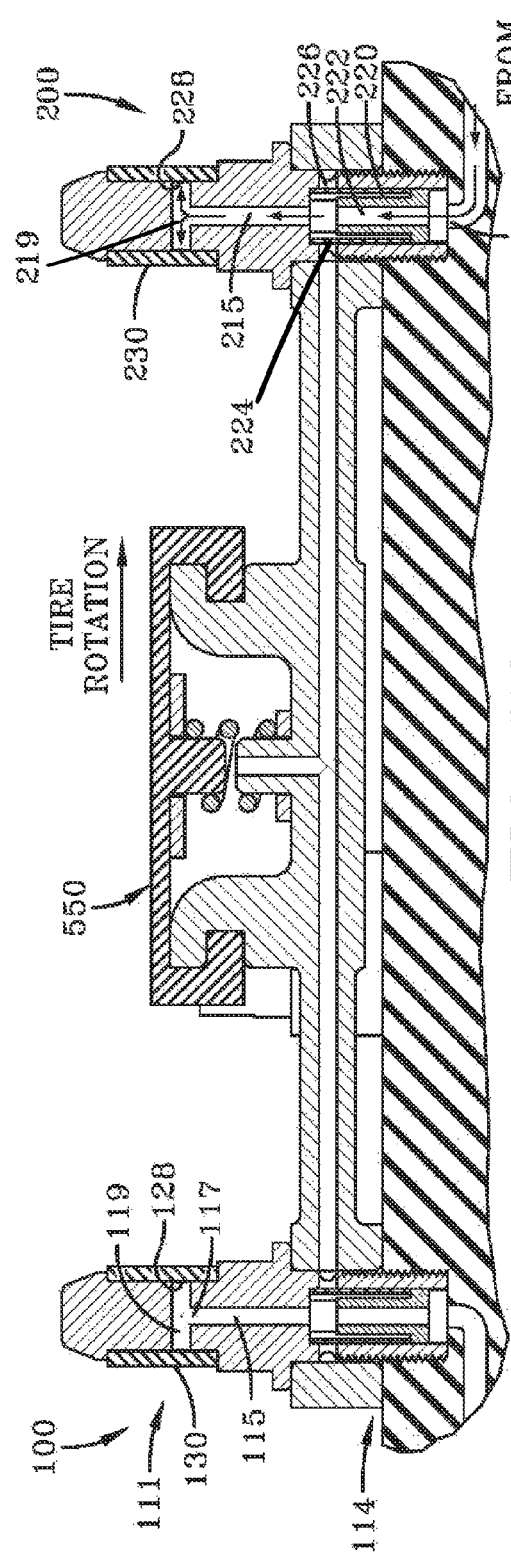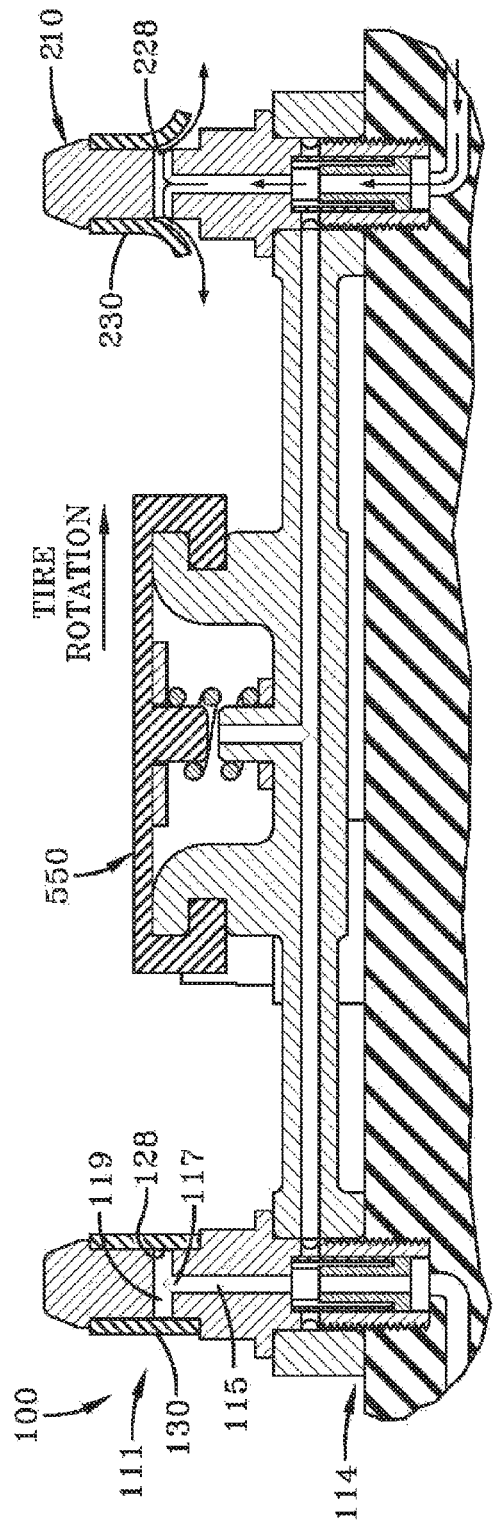

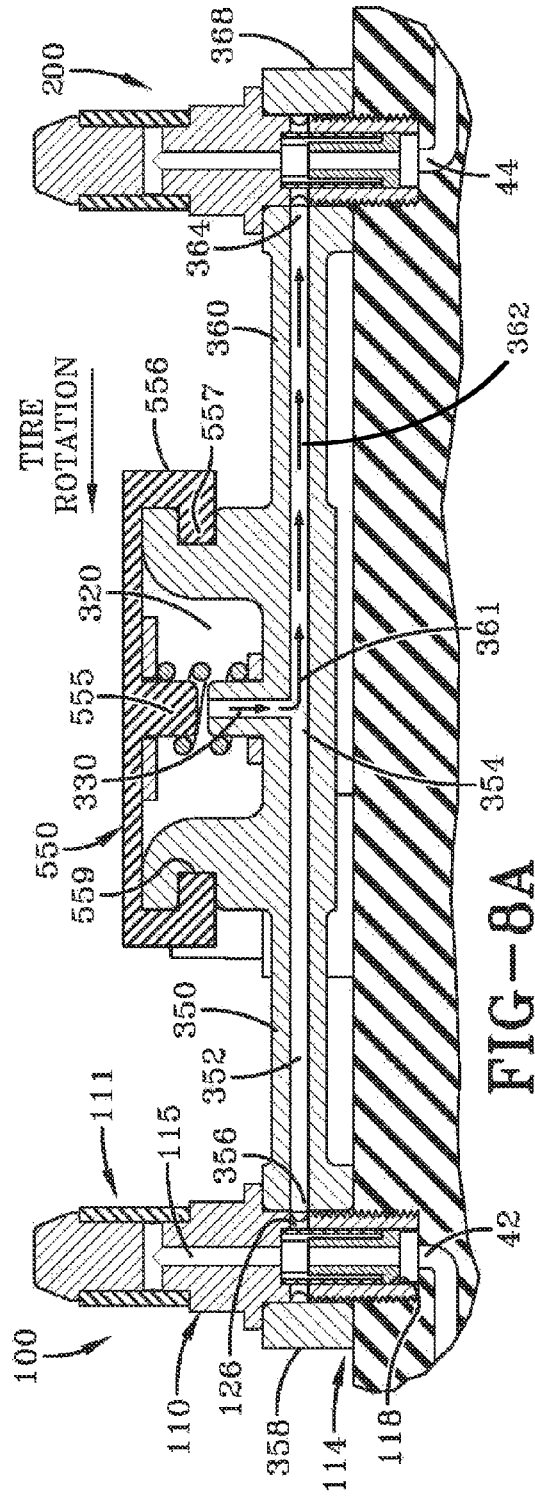

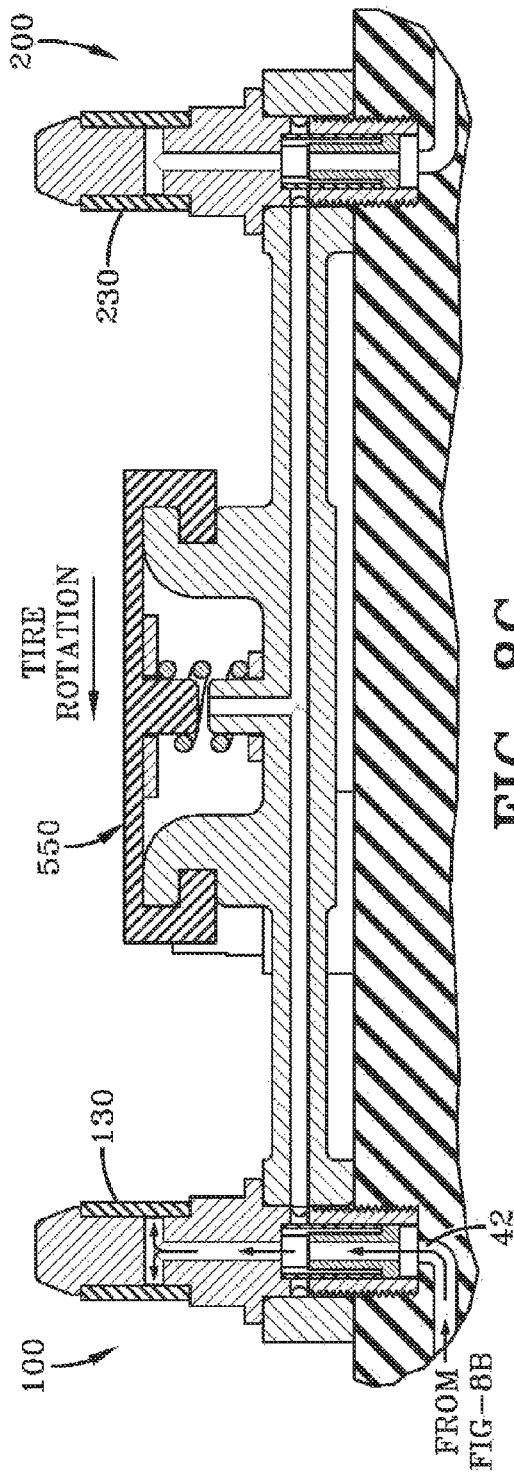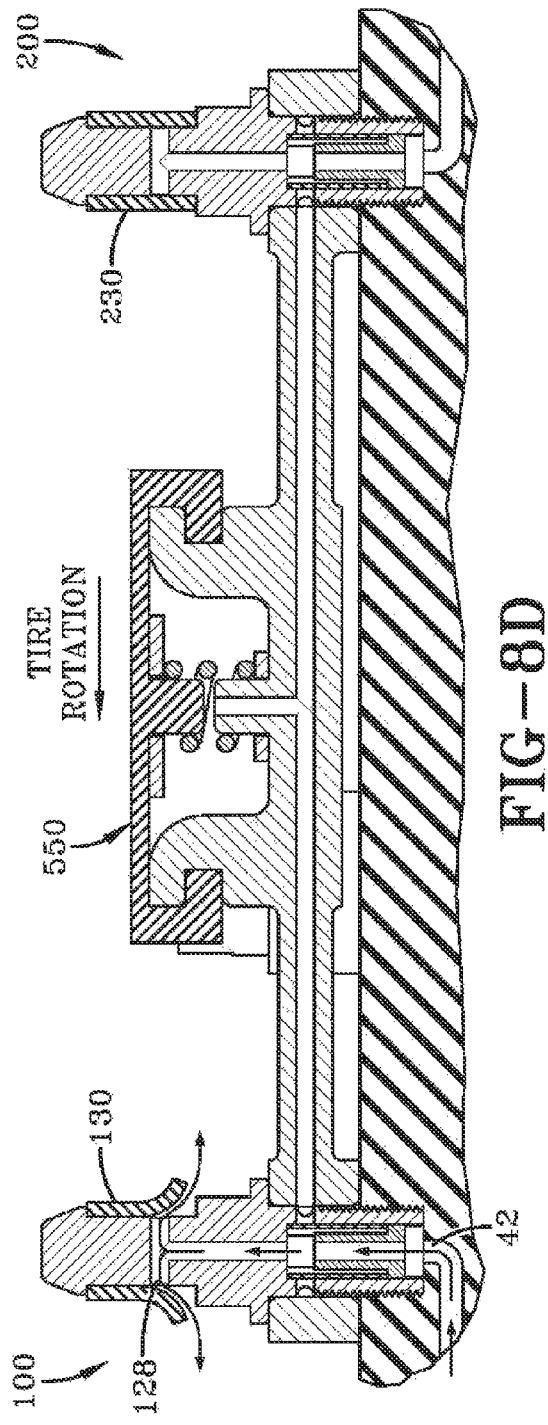

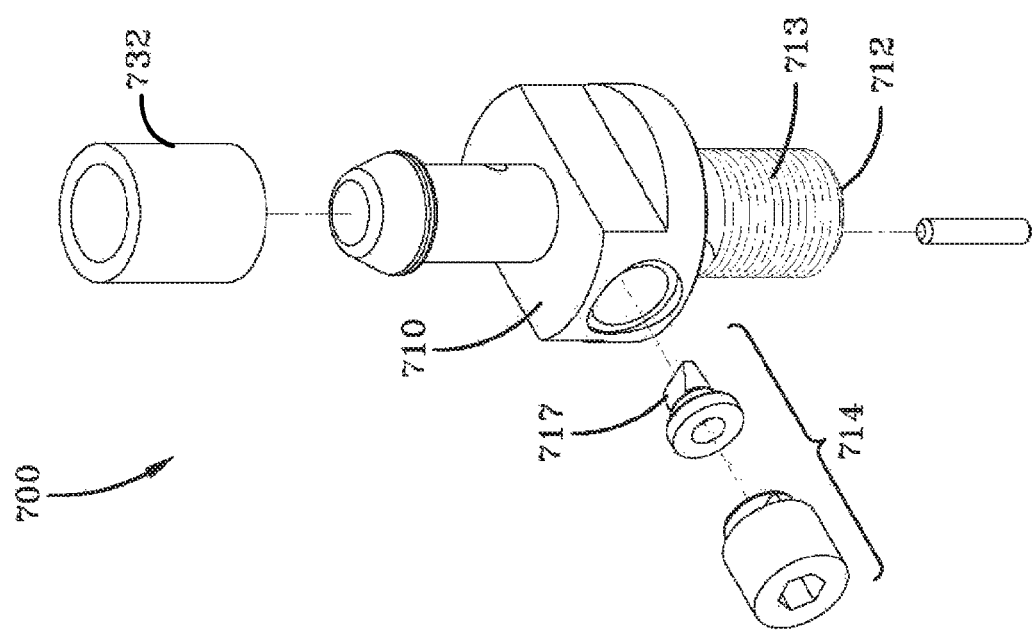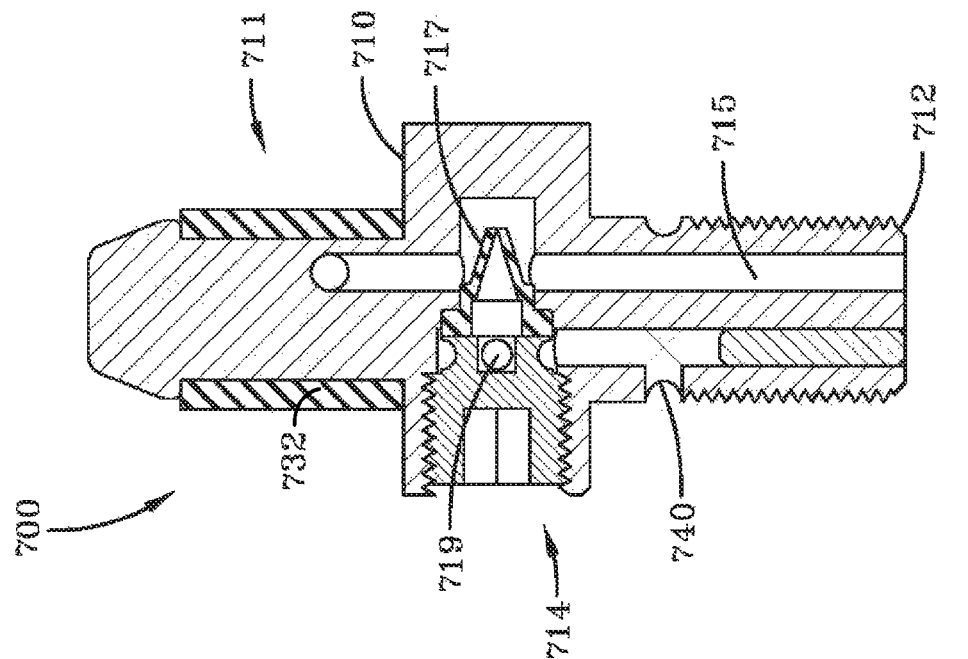

SELF-INFLATING TIRE WITH PRESSURE REGULATOR

FIELD OF THE INVENTION

The invention relates generally to self-inflating tires and, more specifically, to a pump mechanism and pressure regulator for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is desirable, therefore, to incorporate a self-inflating feature within a tire that will self-inflate the tire in order to compensate for any reduction in tire pressure over time without the need for driver intervention.

SUMMARY OF THE INVENTION

The invention provides in a first aspect a self-inflating tire assembly which includes a tire mounted to a rim, the tire having a tire cavity, first and second sidewalls extending respectively from first and second tire bead regions to a tire tread region; an air passageway having an first end and a second end, the air passageway being composed of a flexible material operative to open and close when the tire rotates, wherein the first end and second end is in fluid communication with the tire cavity; a regulator device having a regulator body having an interior chamber; a pressure membrane being mounted on the regulator device to enclose the interior chamber, wherein the pressure membrane has a lower surface that is positioned to open and close the outlet port mounted in the interior chamber, wherein the pressure membrane is in fluid communication with the tire cavity pressure; wherein the body of the regulator device has a first, second and third flexible duct, wherein said first, second and third flexible ducts each have an internal passageway; wherein the third flexible duct has a first end in fluid communication with the outside air, and a second end in fluid communication with the interior chamber of the regulator device, wherein the first flexible duct has a first end in fluid communication with the first end of the air passageway, and a second end in fluid communication with the interior chamber of the regulator device; wherein the second flexible duct has a first end in fluid communication with the second end of the air passageway, and a second end in fluid communication with the interior chamber of the regulator device.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of a surface, perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6A is a section view of FIG. 5 in the direction 6-6 showing the regulator in the closed position during operation.

FIG. 6B is a section view of FIG. 5 in the direction 6-6 showing the regulator in the open position during operation.

FIGS. 7A-7D are section views of FIG. 5 in the direction 7-7 showing the sequence of events as flow travels through the system regulator during operation when the tire is rotating in a clockwise direction.

FIGS. 8A-8D are section views of FIG. 5 in the direction 7-7 showing the sequence of events as flow travels through the system regulator during operation when the tire is rotating in a counterclockwise direction.

FIG. 9A is a cross-sectional view of a second embodiment of a double valve.

FIG. 9B is an exploded front view of the second embodiment of the double valve shown in FIG. 9A.

DETAILED DESCRIPTION OF THE INVENTION

Figure 1:
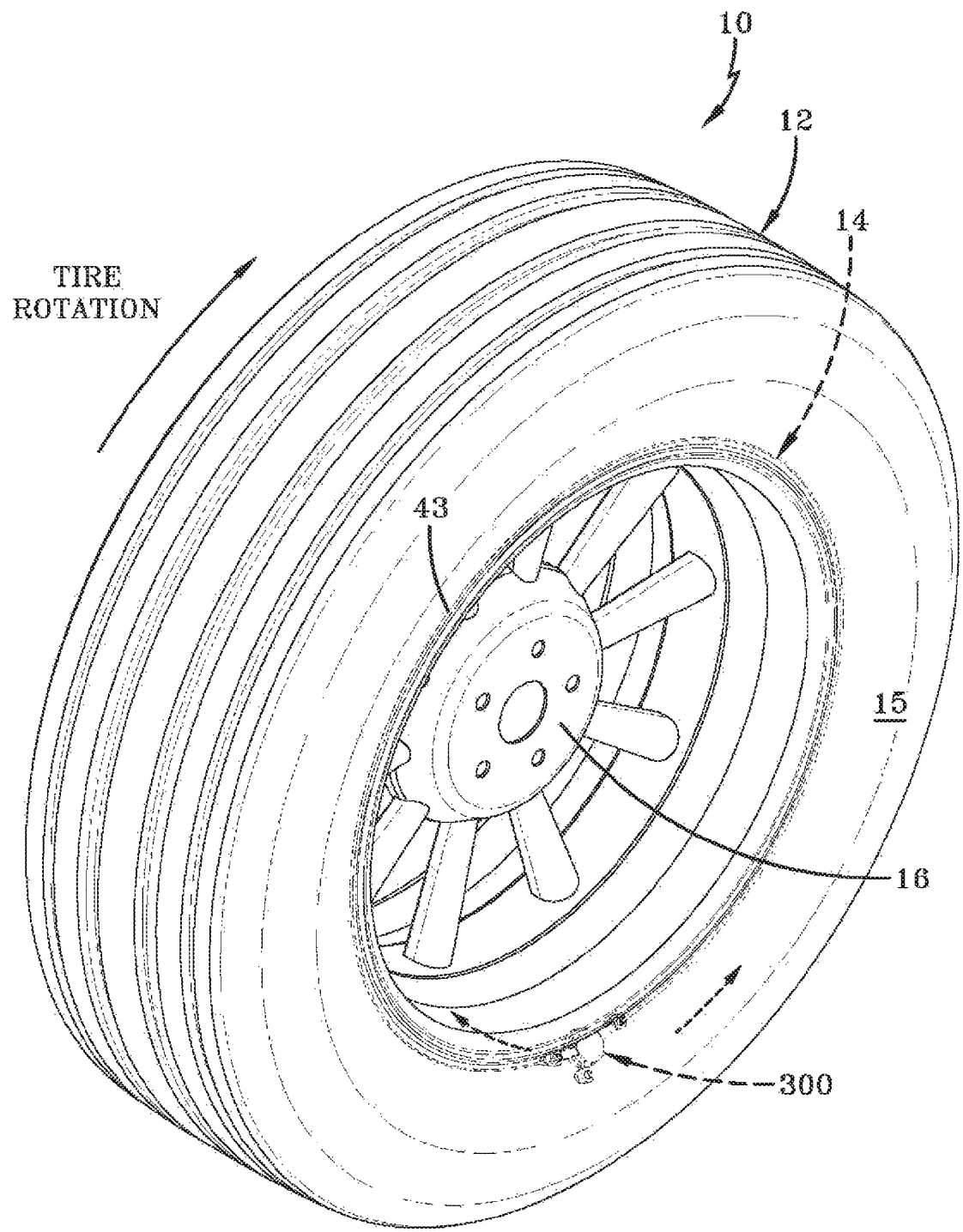
FIG. 1 is an isometric view of tire and rim assembly showing a pump and regulator assembly.

Referring to FIGS. 1 and 2, a tire assembly 10 includes a tire 12, a pump assembly 14, and a wheel rim 16. The tire and rim enclose a tire cavity 40. As shown in FIGS. 1-3, the pump assembly 14 is preferably mounted into the sidewall area 15 of the tire, preferably near the bead region.

Pump Assembly 14

The pump assembly 14 includes an air passageway 43 which may be molded into the sidewall of the tire during vulcanization or formed post cure. The air passageway may be molded into shape by the insertion of a removable strip that forms the passageway when removed. The passageway 43 acts as a pump. The air passageway 43 is preferably molded into the tire sidewall as shown in FIG. 2, and has an arc length as measured by a respective angle Ψ relative to the tire rotational axis in the range of at least 330 degrees, and more preferably in the range of about 330-380 degrees. The pump air passageway 43 may also be formed of a discrete tube formed of a resilient, flexible material such as plastic, elastomer or rubber compounds, and is capable of withstanding repeated deformation cycles when the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. Preferably, the tube has a circular cross-sectional shape, although other shapes such as elliptical may be utilized.

Figure 2A:
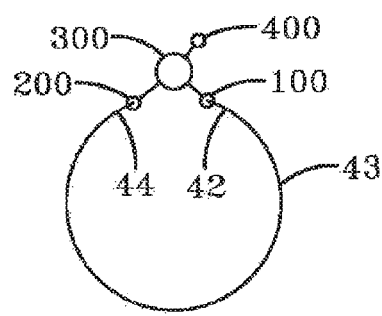
FIG. 2A is a schematic of the pump and regulator assembly of FIG. 1.
Figure 3:
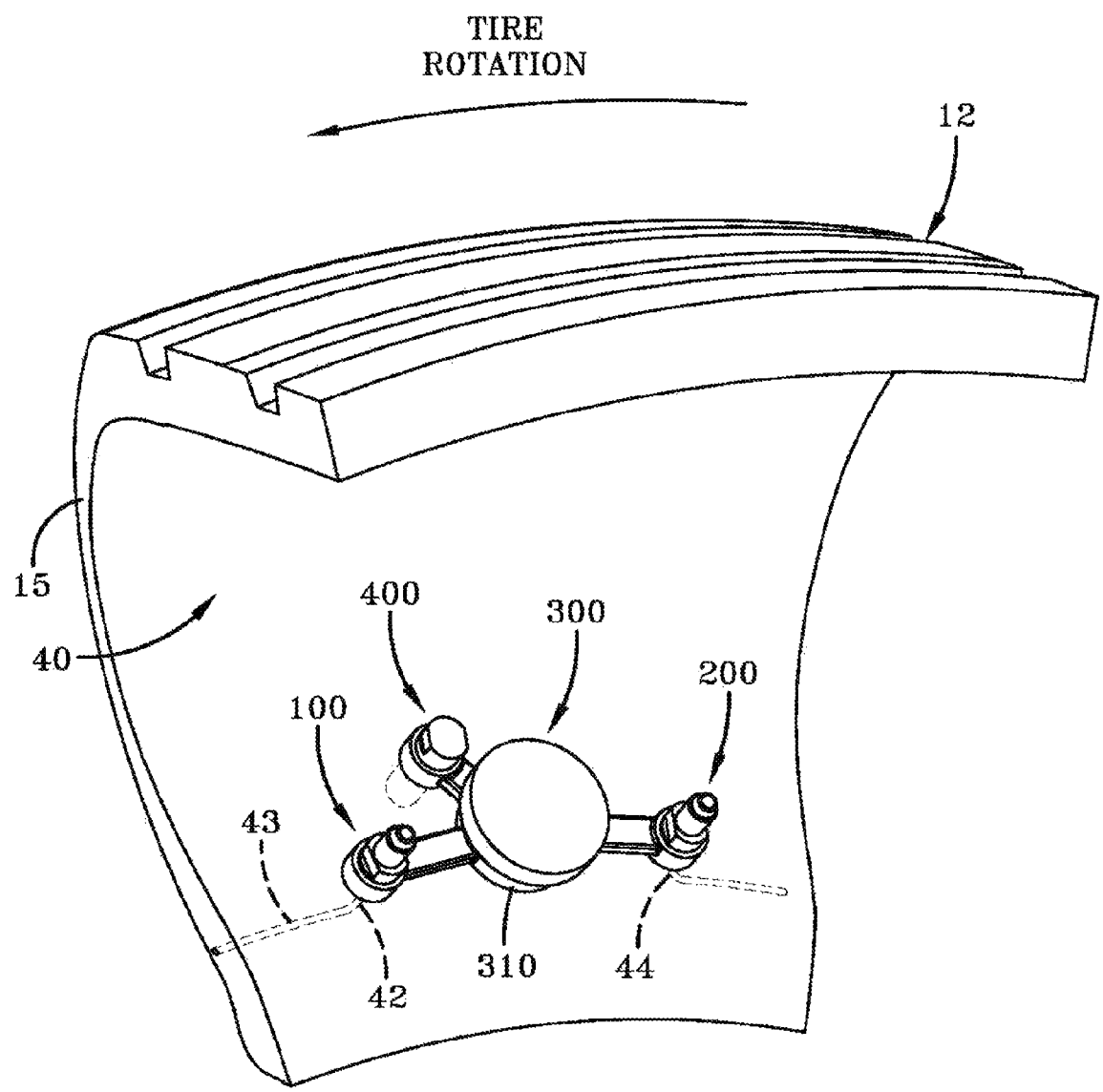
FIG. 3 is a partial front view of the pump and regulator assembly as shown from inside the tire of FIG. 1.
Figure 4:
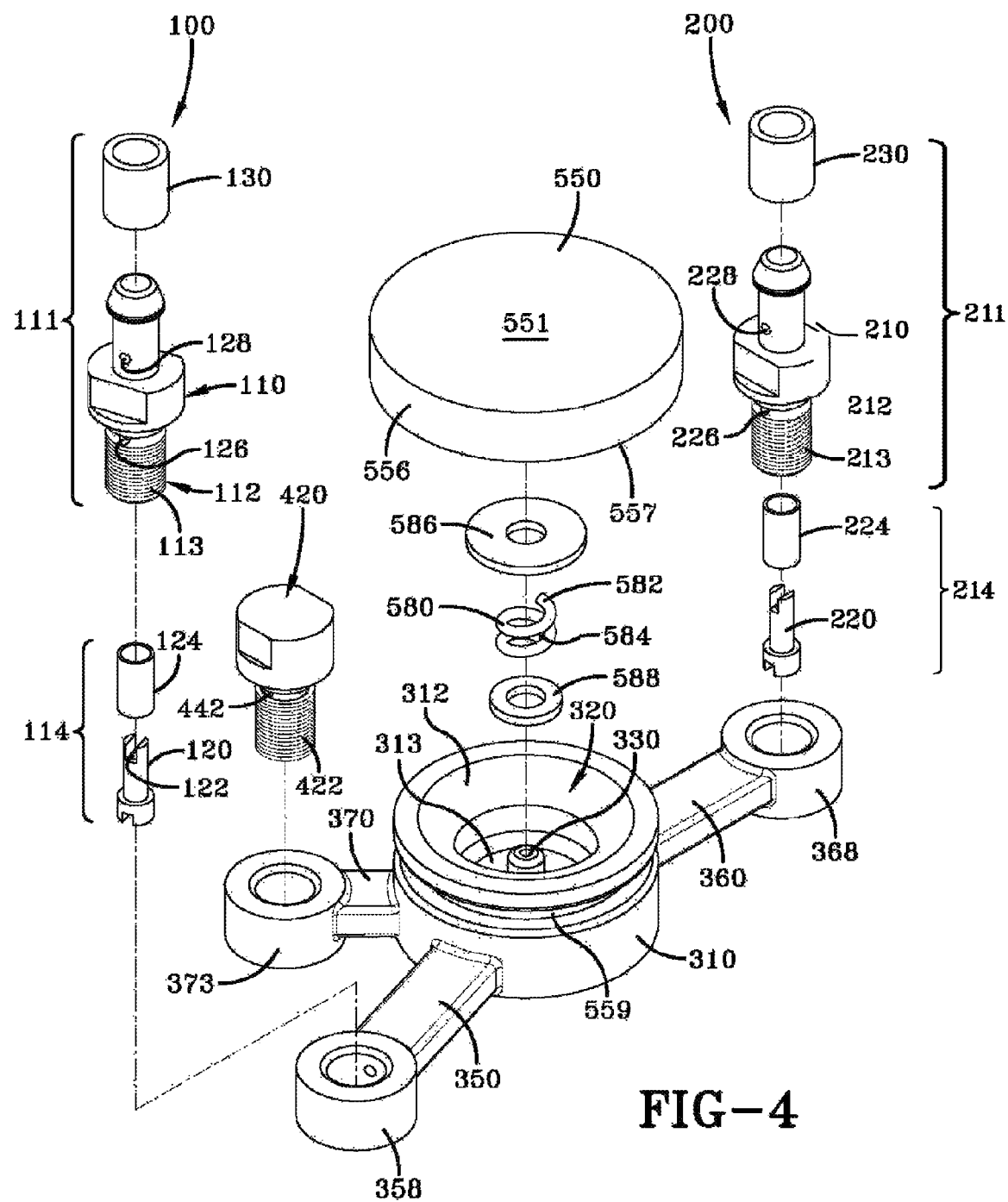
FIG. 4 is an exploded view of the regulator assembly.

As shown in FIG. 2A, an inlet filter assembly 400 is connected to a regulator device 300 for providing inlet filtered air to the regulator device 300.

Regulator Device

The regulator device 300 is shown in FIGS. 2-8. The regulator device 300 functions to regulate the flow of air to the air passageway 43. The regulator device 300 has a central regulator housing 310 that houses an interior chamber 320. The interior chamber 320 has a central opening 312. Opposite the central opening 312 is an outlet port 330. The outlet port is raised from the bottom surface 313 and extends into the interior of the chamber 320. The outlet port is positioned to engage a pressure membrane 550.

The pressure membrane has an upper surface 551 that is substantially planar. The pressure membrane has a lower surface 553 wherein a plug 555 extends from the lower surface. The pressure membrane further has an annular sidewall 556 which extends downwardly from the upper surface, forming a lip 557. The lip 557 is preferably annular, and snaps in an annular slot 559 formed on the outer regulator housing 310. The pressure membrane is a disk shaped member made of a flexible material such as, but not limited to, rubber, elastomer, plastic or silicone. The lower surface 553 of the pressure membrane is in fluid communication with the interior chamber 320. The plug 555 is positioned to close the outlet port 330. A spring 580 is positioned in the interior chamber 320 to bias the pressure membrane 550 in the open position. The spring has a first end 582 that is received about the plug 555. The spring has a second end 584 that is wrapped around the outer surface of the outlet port 330. A first washer 586 may be received between the spring first end 582 and the pressure membrane 550. A second washer 588 may be received between the spring second end 584 and the bottom of the chamber 313. Thus the balance of pressure forces on each side of the pressure membrane actuates the pressure membrane plug 555 to open and close the outlet port 330.

Extending from the central regulator housing 310 is a first, second and third flexible duct 350, 360, 370 positioned on either side of the central regulator housing 310. Each flexible duct 350, 360, 370 may be integrally formed with the regulator housing as shown, or be a discrete part connected to the central regulator housing 310. Each flexible duct 350, 360, 370 has an internal passageway 352, 362, 372 for communicating fluid.

As shown in FIG. 7A, the internal passageway 352 of the first flexible duct 350 has a first end 354 that is connected to the outlet port 330. The internal passageway 352 of the first flexible duct 350 has a second end 356 that is in fluid communication with a first valve 100. The second end terminates in a circular flange 358 that is received about the outer body of the first valve 100. The first valve 100 is connected to the first end 42 of the pump passageway 43.

As shown in FIG. 7A, the second flexible duct 360 has an internal passageway 362 having a first end 361 that is connected to the outlet port 330 of the interior chamber 320 and the internal passageway 352 of the first flexible duct 350. The internal passageway 362 has a second end 364 in fluid communication with a second valve 100. The second flexible duct has a circular flange distal end 368 that is received about the outer body of the second valve 100.

Figure 5:
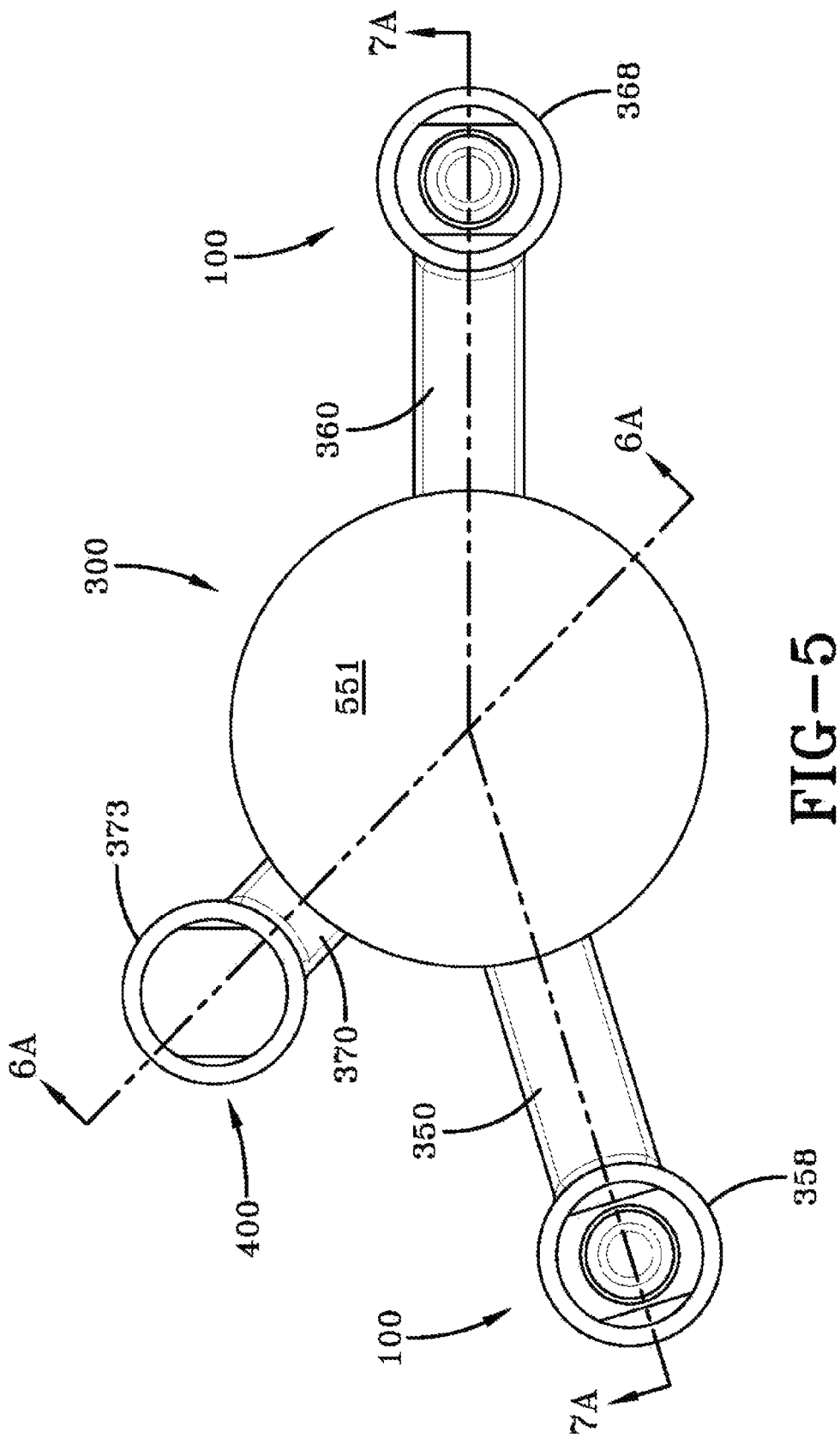
FIG. 5 is a top view of the regulator assembly of FIG. 4.

As shown in FIGS. 5 and 6A, the third flexible duct 370 connects an inlet filter assembly 400 to the internal chamber 320 of the pressure regulator 300. The internal passageway 372 of the third flexible duct 370 has an outlet 374 that is connected to the outlet port 442 of the inlet filter assembly 400. The distal end of the third flexible duct terminates in a circular flange 373 that is received about the outer body of the inlet filter assembly 400. The internal passageway 372 of the first flexible duct 370 has a second end 376 that opens to the inlet chamber 320 of the regulator 300.

Inlet Filter Assembly

The inlet filter assembly 400 is shown in FIGS. 6A, 6B. The inlet filter assembly 400 includes an insert sleeve 412 that is hollow and has an internal threaded bore 414 that extends completely therethrough. The insert sleeve 412 has a first end that is inserted into the tire, typically in the outer surface of the sidewall 15. The insert sleeve 412 may be inserted into the tire post cure or may be molded into the tire. The insert sleeve first end has an enlarged bore 424 for receiving the threaded end 422 of an air passage screw 420. The insert sleeve has a second end that is positioned on the outer surface of the tire to provide ambient air to the internal bore 414. The air passage screw 420 has an internal passageway 430 having an opening 432 in fluid communication with the bore 414 of the insert sleeve 412. A filter 440 is received within the insert sleeve 412 near the inlet end. The internal passageway 430 of the air passage screw 420 has outlet holes 442 in fluid communication with the inlet 374 of the internal passageway 372 of the third flexible duct 370.

Inlet/Outlet Valve

The first end 42 of the pump passageway 43 is connected to a first valve 100. The second end 44 of the pump passageway 43 is connected to a second valve 100. The first and second valves 100 are shown as structurally the same, although one or both of the valves could be as valve 200 shown in FIG. 9A. The first and second valve 100 is shown in operation in FIGS. 7A-D. The valve 100 includes a valve body 110 having an upper valve 111, and a lower valve 114. The upper valve 111 communicates pumped air from the pump to the tire cavity, and the lower valve communicates flow from the regulator to the pump. The lower valve 114 has a first end 112 having an outer threaded surface 113 that is mounted within the sidewall of the tire. The valve body 110 has a central passage 115 that extends substantially through the valve body 110, i.e., the central passage connects the upper valve 111 to the lower valve 114.

The lower valve 114 has a first end of the central passage 115 having an enlarged opening 118 that is in fluid communication with the pump passageway 4-3 first end 42. A cylindrical support member 120 is received in the enlarged opening 118 of the central passage 115. The cylindrical support member 120 has a bore 122 that extends therethrough. A flexible collar 124 is received about the cylindrical support member 120. The outer end of the flexible collar 124 is positioned to open and close holes 126 to communicate flow from the first flexible duct passageway 352 to the passage 115 and then to the pump passageway 42, or from the pump passageway 42, through the valve body passage 115 to the flexible duct passageway. Thus the valve 100 works when the flow is traveling in either direction. FIG. 7A illustrates flow from the regulator 300 traveling through the first flexible duct towards the lower valve 114. As shown in FIG. 7b, the pressure from the flow partially folds the flexible collar 124 so that the fluid enters central passage 115. The flow travels through the central bore 122 and into the pump. As shown in FIG. 7C, the flow travels through the 360 degree pump and to the second end 44 of the pump. The flow enters the lower end of the double valve 214 through the bore 222 of the cylindrical support member 220 and then through the central passage 215.

The central passage 115 has a second end 117 that terminates in the upper valve 111 into a transverse passage 119. The transverse passage 119 is perpendicular to the central passage 115, forming a T shaped passage. A second flexible sleeve 130 is mounted to the valve body 110 and is positioned to open and close the outlet holes 128 of the transverse passage 119.

FIGS. 7C and 7D illustrate the upper valve in action. Pumped air exits the pump outlet end 44, and travels through the lower valve 114. The sleeve 124 prevents the flow from exiting the valve. The flow travels to the upper valve 111 through central passage 115. The second flexible sleeve 130 opens to release the flow into the tire cavity 40 as shown in FIG. 7D. The operation of flow through the valves depends on the direction of the tire rotation. FIGS. 7A-7D illustrate the system in operation for clockwise tire rotation, while FIGS. 8A-8D illustrate the system in operations for counterclockwise tire rotation. As shown in the Figures, each valve 100 can port flow from the pump outlet to the tire cavity via the upper valve 111, or port flow from the regulator to the pump inlet via the lower valve 114.

A second embodiment 700 of a double valve is shown in FIG. 9A and FIG. 9B. The double valve 700 includes a valve body 710 having an upper valve 711, and a lower valve 714. The upper valve 711 communicates pumped air from the pump to the tire cavity through a passage 715, and the lower valve communicates flow from the regulator to the pump through the passage 715.

The valve body 710 has a first end 712 having an outer threaded surface 713 that is mounted within the sidewall of the tire. The lower valve 714 is inserted into a transverse passage 716 that intersects passage 715. The lower valve 714 is a check valve, preferably a duckbill check valve as shown. The duckbill check valve has elastomeric lips 717 in the shape of a duckbill which prevents backflow and allows forward flow from the inlet 719 to the passage 715. The flow exits the duckbill elastomeric lips into the passage 715. The lower valve 714 could also be other types of check valves known to those skilled in the art, such as ball valves, etc. FIG. 10 illustrates flow from the regulator into the flexible duct, and into the angled passage 740 to the inlet 719 of the duckbill check valve. The flow exits the check valve through the lips 717 into the passage 715 and then to the pump inlet.

Figure 10A:
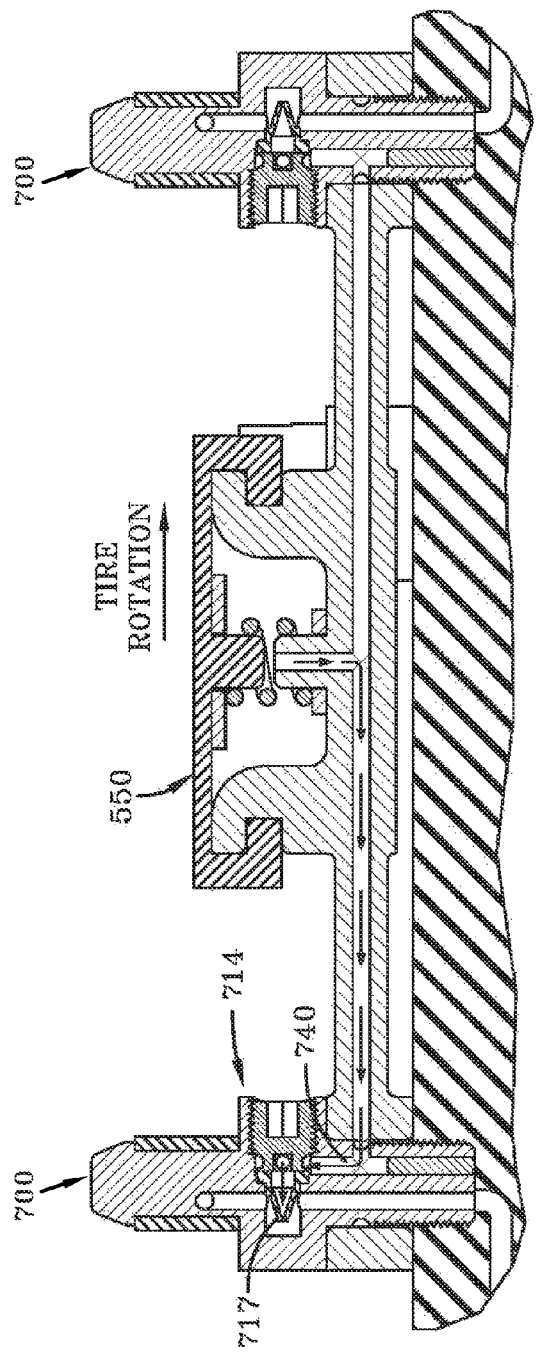
FIGS. 10A-10D are section views of FIG. 5 in the direction 7-7 showing the sequence of events as flow travels through the system regulator with the second embodiment of the double valve, during operation when the tire is rotating in a clockwise direction.
Figure 10B:
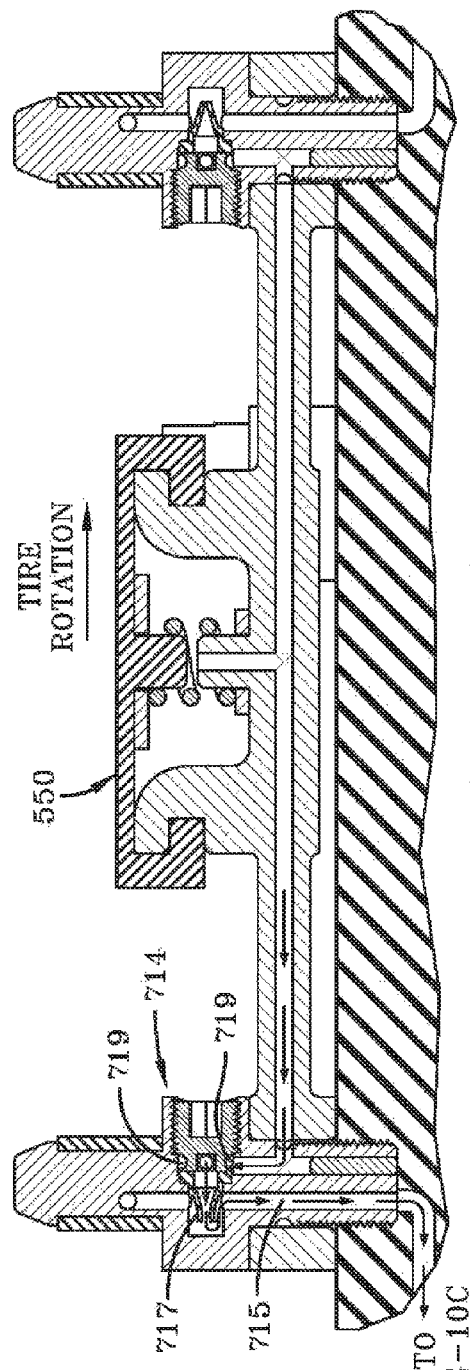
Figure 10C:
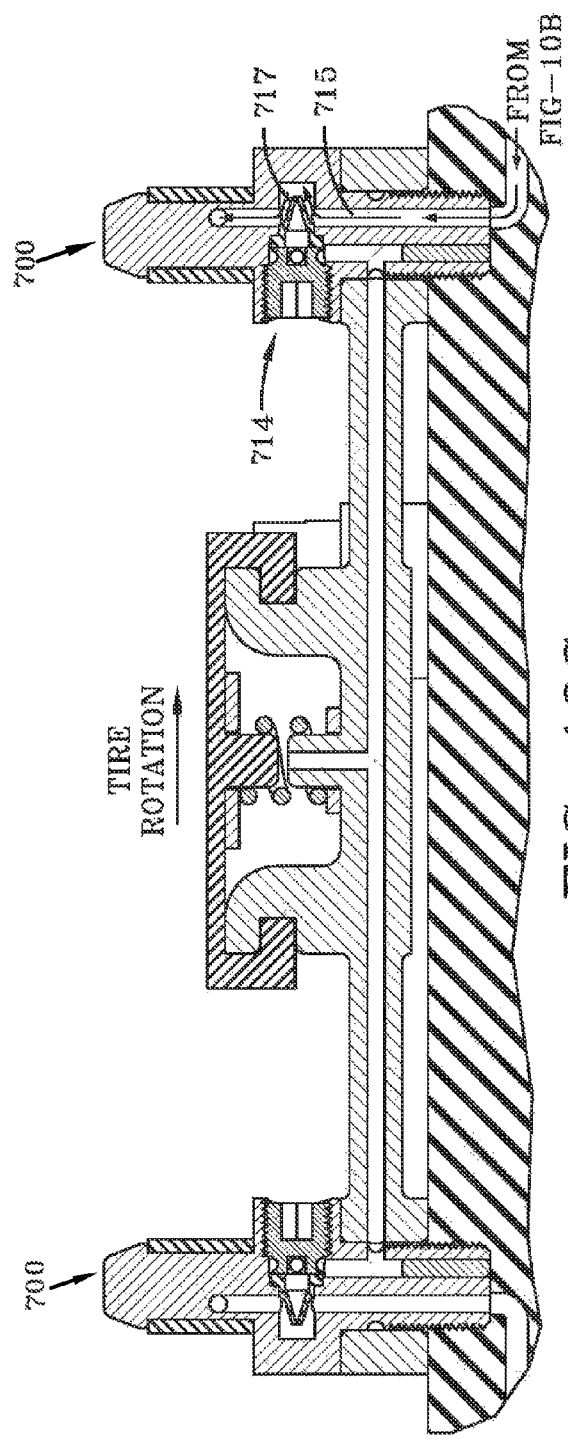
Figure 10D:
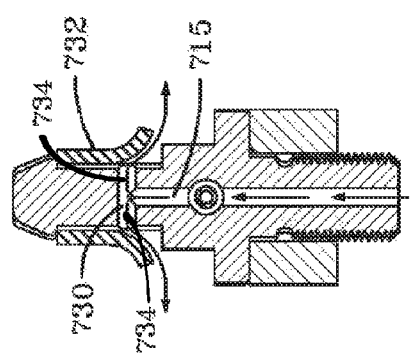

The upper valve 711 is a sleeve type check valve, having an outer annular flexible sleeve 732 that opens and closes over outlet holes 734 of outlet passageway 730. Outlet passageway 730 is in fluid communication with passage 715. FIGS. 10C and 10D illustrate the upper valve during operation, when flow from the pump is directed through the passage 715, past the duckbill lips 717 which blocks entry to the lower valve 714, and to outlet passageway 730 through the sleeve 732 and into the tire cavity.

System Operation

Figure 2B:
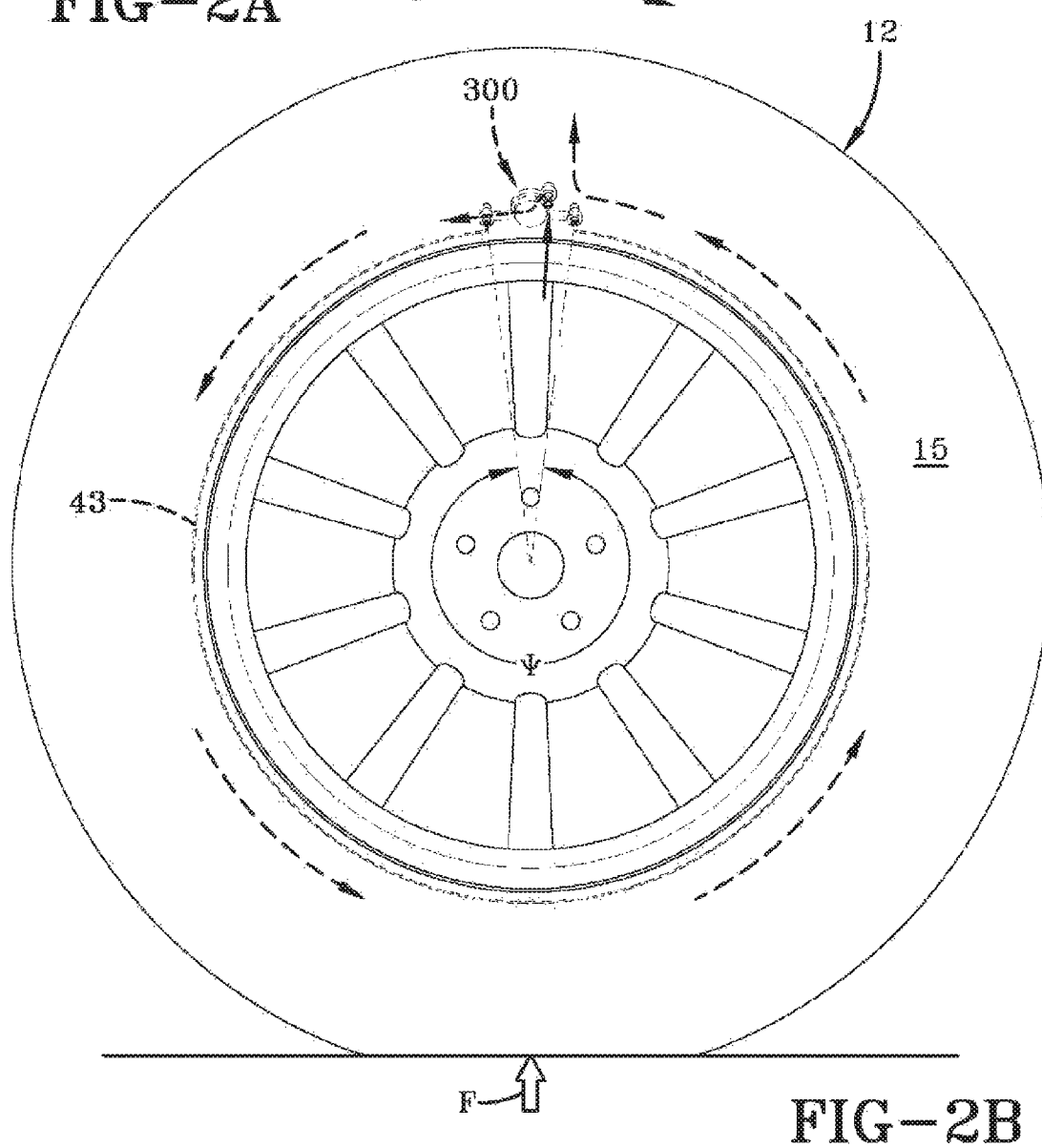
FIG. 2B is a front view of the tire of FIG. 1 showing the system in operation.

FIGS. 1-2 illustrate a 360 degree pump assembly 14. The system is bidirectional, so that the pump can pump in either direction of rotation. As shown in FIGS. 2A and 2B, the regulator device 300 is in fluid communication with the first end 42 of the pump passageway 43. As the tire rotates in the clockwise direction as shown in FIG. 2B, a footprint is formed against the ground surface. A compressive force F is directed into the tire from the footprint and acts to flatten the pump passageway 43. Successive flattening of the pump passageway 43 as the tire rotates and forces the compressed air towards the pump outlet in a direction opposition the direction of rotation of the tire. Due to the increase in pressure at the pump outlet 44, the double valve 100 directs the flow through the valve central passage and into the tire cavity 40.

The regulator device 300 controls the inflow of outside air into the pump. If the tire pressure is above the preset threshold value, the plug 555 of the pressure membrane seals the central outlet port 330 and no air enters the pump passageway, as shown in FIG. 6A. The pressure preset threshold value can be predetermined based upon the tire size, and the material properties of the pressure membrane, and spring constant can be selected to determine the pressure at the preset threshold value. If the tire pressure falls below the preset threshold value, the plug 555 of the membrane 550 will unseat from the central outlet port 330, opening the outlet port 330 as shown in FIG. 6B. As the chamber pressure 320 falls due to the opening of the central outlet port 330, outside air will be sucked through the filter 440, through the central passageway 430, through the third flexible duct 372 to the interior chamber 320. If the tire rotates in a clockwise direction, the filtered air exits the interior chamber through the outlet port 330, and enters the passageway 352 of the first flexible duct 350. Then the filtered air passes through the double valve 100 into the lower valve 114 and then into the pump inlet 42, as shown in FIGS. 7A and 7B. The flow is then compressed through the pump passageway 43 and then enters the double valve 100, as shown in FIG. 7C. The flow travels through the lower valve through the central passage 115' into the upper valve 111. The flow exits the upper valve into the tire cavity 40 via the sleeve 130 which opens under the pressure of the flow. The pump will pump air with each tire rotation. The pump passageway 43 fills with air when the pump system is not in the footprint.

If the tire rotates in a counterclockwise direction, the operation of the system is shown in FIGS. 8A-8D. The filtered air exits the interior chamber 320 through the outlet port 330, and enters the second flexible duct 360 then through the lower valve 114 of the double valve 100 and then into the pump inlet 44. The flow is then compressed through the pump passageway 43 to the pump outlet 42. As shown in FIGS. 8C and 8D, the flow exits the upper valve 111' into the tire cavity 40. The pump will pump air with each tire rotation. The pump passageway 43 fills with air when the pump system is not in the footprint.

The location of the pump assembly in the tire will be understood from FIGS. 1, 2A and 3. In one embodiment, the pump assembly 14 is positioned in the tire sidewall, radially outward of the rim flange surface. So positioned, the air passageway 43 is radially inward from the tire footprint and is thus positioned to be flattened by forces directed from the tire footprint as described above. Although the positioning of the air passageway 43 is specifically shown in a region of the tire near the bead region, it is not limited to same, and may be located at any region of the tire that undergoes cyclical compression. The cross-sectional shape of the air passageway 43 may be elliptical or round or any desired shape.

The length as represented by the angle $\Psi$ of each pump passageway is illustrated at about 350-360 degrees, the invention is not limited to same, and may be shorter or longer as desired.

The pump assembly 14 may also be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
    a tire mounted to a rim, the tire having a tire cavity, first and second sidewalls extending respectively from first and second tire bead regions to a tire tread region;
    an air passageway having an first end and a second end, the air passageway being composed of a flexible material operative to open and close when the tire rotates, wherein the first end and second end is in fluid communication with the tire cavity;
    a regulator device having a regulator body having an interior chamber; a pressure membrane being mounted on the regulator device to enclose the interior chamber, wherein the pressure membrane has a lower surface that is positioned to open and close an outlet port mounted in the interior chamber, wherein the pressure membrane is in fluid communication with the tire cavity pressure;
    wherein the body of the regulator device has a first, second and third flexible duct, wherein said first, second and third flexible ducts each have an internal passageway; wherein the third flexible duct has a first end in fluid communication with the outside air, and a second end in fluid communication with the interior chamber of the regulator device; and
    wherein the first flexible duct has a first end in fluid communication with the first end of the air passageway, and a second end in fluid communication with the interior chamber of the regulator device; wherein the second flexible duct has a first end in fluid communication with the second end of the air passageway, and a second end in fluid communication with the interior chamber of the regulator device.

2. The self-inflating tire assembly of claim 1 wherein the first and second flexible duct are in fluid communication with each other.

3. The self-inflating tire assembly of claim 1 wherein the first and second flexible duct are in fluid communication with the outlet port of the interior chamber.

4. The self-inflating tire assembly of claim 1 wherein a spring is positioned in the interior chamber, wherein the spring biases the pressure membrane into the open position.

5. The self-inflating tire assembly of claim 1, wherein a first one way valve is in fluid communication with the first end of the air passageway and the first end of the first flexible duct.

6. The self-inflating tire assembly of claim 1, wherein a second one way valve is in fluid communication with the first end of the air passageway and the tire cavity.

7. The self-inflating tire assembly of claim 1, wherein a double valve has a first one way valve in fluid communication with the first end of the air passageway and the tire cavity, and a second one way valve in fluid communication with the first end of the air passageway and the first end of the first flexible duct.

8. The self-inflating tire assembly of claim 7 wherein the double valve has a passage in fluid communication with the first one way valve and the second one way valve.

9. The self-inflating tire assembly of claim 1, wherein a double valve is positioned between the outlet of one of the first, second and third flexible ducts and an end of the air passageway, wherein the double valve is in fluid communication with the air passageway, the tire cavity, and the internal chamber of the regulator.

10. The self-inflating tire assembly of claim 5, wherein the first one way valve is a duck bill check valve.

11. The self-inflating tire assembly of claim 6, wherein the second one way valve has a flexible sleeve positioned over an outlet hole of the second one way valve.

12. The self-inflating tire assembly of claim 1 wherein the first air passageway is located in the sidewall of the tire.

13. The self-inflating tire assembly of claim 1 wherein the second air passageway is located in the sidewall of the tire.

14. The self-inflating tire assembly of claim 1 wherein the inlet device has a filter.

15. The self-inflating tire assembly of claim 1, wherein the air passageway has an elliptically-shaped cross-section.

16. The self-inflating tire assembly of claim 1, wherein the air passageway is positioned between a tire bead region and the rim tire mounting surface radially inward of the tire tread region.

* * * * *